United States Patent
Cypher

(10) Patent No.: US 8,484,536 B1
(45) Date of Patent: Jul. 9, 2013

(54) TECHNIQUES FOR DATA STORAGE, ACCESS, AND MAINTENANCE

(75) Inventor: Robert Cypher, Saratoga, CA (US)

(73) Assignee: Google Inc., Mountain View, CA (US)

(*) Notice: Subject to any disclaimer, the term of this patent is extended or adjusted under 35 U.S.C. 154(b) by 387 days.

(21) Appl. No.: 12/748,066

(22) Filed: Mar. 26, 2010

(51) Int. Cl.
*G11C 29/00* (2006.01)
*H03M 13/00* (2006.01)
*G06F 11/00* (2006.01)
*G06F 13/00* (2006.01)

(52) U.S. Cl.
USPC ........... 714/766; 714/752; 714/753; 714/755; 714/6.2; 714/6.21; 714/6.24; 711/148; 711/153

(58) Field of Classification Search
USPC ............... 714/6.2, 6.21, 6.24, 752, 753, 755, 714/766; 711/148, 153
See application file for complete search history.

(56) References Cited

U.S. PATENT DOCUMENTS

| | | | | |
|---|---|---|---|---|
| 6,032,269 | A * | 2/2000 | Renner, Jr. | 714/37 |
| 6,151,641 | A * | 11/2000 | Herbert | 710/22 |
| 6,216,247 | B1 * | 4/2001 | Creta et al. | 714/763 |
| 6,378,038 | B1 * | 4/2002 | Richardson et al. | 711/114 |
| 6,721,317 | B2 * | 4/2004 | Chong, Jr. | 370/389 |
| 7,356,752 | B2 * | 4/2008 | Hewitt et al. | 714/755 |
| 7,398,459 | B2 * | 7/2008 | Park et al. | 714/800 |
| 7,505,890 | B2 * | 3/2009 | Kuznetsov et al. | 703/27 |
| 7,546,484 | B2 * | 6/2009 | Sen et al. | 714/6.3 |
| 7,624,229 | B1 * | 11/2009 | Longinov | 711/113 |
| 7,676,730 | B2 * | 3/2010 | Haugan et al. | 714/769 |
| 7,739,446 | B2 * | 6/2010 | Kano | 711/112 |
| 7,774,681 | B2 * | 8/2010 | Earhart et al. | 714/763 |
| 7,831,764 | B2 * | 11/2010 | Nakajima et al. | 711/103 |
| 7,861,035 | B2 * | 12/2010 | Baek et al. | 711/114 |
| 7,861,052 | B2 * | 12/2010 | Kawamura et al. | 711/165 |
| 8,065,555 | B2 * | 11/2011 | Maiyuran et al. | 714/6.12 |
| 8,082,393 | B2 * | 12/2011 | Galloway et al. | 711/114 |
| 8,086,783 | B2 | 12/2011 | O Connor et al. | |
| 8,090,792 | B2 * | 1/2012 | Dubnicki et al. | 709/217 |
| 8,140,753 | B2 * | 3/2012 | Galloway et al. | 711/114 |
| 8,145,865 | B1 * | 3/2012 | Longinov et al. | 711/165 |
| 8,176,247 | B2 * | 5/2012 | Galloway et al. | 711/114 |
| 8,180,954 | B2 * | 5/2012 | Kilzer et al. | 711/103 |
| 8,213,205 | B2 * | 7/2012 | Rajan | 365/51 |
| 8,234,539 | B2 * | 7/2012 | Erez | 714/755 |
| 8,255,761 | B1 | 8/2012 | Pi et al. | |

(Continued)

OTHER PUBLICATIONS

Wikipedia; Reed Solomon; http://en.wikipedia.org/wiki/Reed_Solomon; last modified Sep. 13, 2006, 14 pages.

(Continued)

*Primary Examiner* — John J Tabone, Jr.

(74) *Attorney, Agent, or Firm* — Fish & Richardson P.C.

(57) ABSTRACT

Methods, systems, and apparatus, including computer program products, featuring generating a plurality of error-correcting code chunks from a plurality of data chunks. The error-correcting code chunks can be used to reconstruct one or more of the data chunks. The data chunks are allocated to a local group of storage nodes. The error correcting code chunks are allocated between the local group of storage nodes and one or more remote groups of storage nodes. Each remote group of storage nodes is allocated one or more unique error-correcting code chunks from the error-correcting code chunks. Any of the error-correcting code chunks not allocated to a remote group of storage nodes are allocated to the local group of storage nodes.

33 Claims, 10 Drawing Sheets

U.S. PATENT DOCUMENTS

| | | |
|---|---|---|
| 8,279,755 B2 | 10/2012 | Luby |
| 8,307,258 B2 | 11/2012 | Flynn et al. |
| 8,327,234 B2 | 12/2012 | Earnshaw et al. |
| 8,327,237 B2 | 12/2012 | Buckley et al. |
| 2003/0056068 A1 | 3/2003 | McAllister et al. |
| 2003/0149750 A1* | 8/2003 | Franzenburg ............... 709/220 |
| 2005/0091234 A1 | 4/2005 | Hsu et al. |
| 2006/0080505 A1* | 4/2006 | Arai et al. .................. 711/114 |
| 2009/0262839 A1 | 10/2009 | Shelby et al. |
| 2009/0265578 A1* | 10/2009 | Baloun et al. ................... 714/6 |
| 2010/0037117 A1* | 2/2010 | Pescatore .................... 714/752 |
| 2010/0217915 A1 | 8/2010 | O Connor et al. |
| 2011/0258161 A1 | 10/2011 | Constantinescu et al. |
| 2012/0036333 A1 | 2/2012 | LeCrone et al. |
| 2012/0042142 A1 | 2/2012 | Garman et al. |
| 2012/0042200 A1* | 2/2012 | Takeuchi et al. ............. 714/6.2 |
| 2012/0042201 A1* | 2/2012 | Resnick ....................... 714/6.2 |
| 2012/0131383 A1* | 5/2012 | Galloway et al. ........... 714/6.22 |
| 2012/0246548 A1 | 9/2012 | Buckley et al. |

OTHER PUBLICATIONS

Hafner, James; "HoVer Erasure Codes for Disk Arrays," Proceedings of the 2006 International Conference on Dependable Systems and Networks; pp. 217-226; 2006; 10 pages.

Li, Mingqiang; "GRID Codes: Strip-Based Erasure Codes with High Fault Tolerance for Storage Systems;" ACM Transactions on Storage, vol. 4, No. 4, Article 15, Jan. 2009; 22 pages.

Duminuco, Alessandro; "Hierarchical Codes: How to Make Erasure Codes Attractive for Peer-to-Peer Storage Systems;" Proceedings of the Eighth International Conference on Peer-to-Peer Computing; 2008 (P2P'08), pp. 8-11; 10 pages.

* cited by examiner

US 8,484,536 B1

TECHNIQUES FOR DATA STORAGE, ACCESS, AND MAINTENANCE

BACKGROUND

This specification relates to data storage, access, and maintenance.

Important data is stored on storage devices that potentially fail. The data can be backed-up and stored redundantly so that the data can be recovered if a storage device fails. Data centers can store large amounts of data. Some data is stored redundantly across multiple data centers so that even if an entire data center fails the data can be recovered.

Data can be stored using error-detecting codes. An error-detecting code adds extra data to the data that enables detection of certain errors in the data. One example of an error-detecting code is a cyclic redundancy check (CRC). CRC codes are used to detect failures on storage devices (e.g., hard disk drives).

Data can also be stored using error-correcting codes. An error-correcting code adds extra data to the data that enables correction of errors in the data. The number of errors that can be corrected is limited by the amount of extra data that is added. Examples of error-correcting codes include Reed-Solomon codes.

SUMMARY

In a first aspect, a computer-implemented method includes generating a plurality of error-correcting code chunks from a plurality of data chunks. The error-correcting code chunks can be used to reconstruct one or more of the data chunks. The data chunks are allocated to a local group of storage nodes. The error correcting code chunks are allocated between the local group of storage nodes and one or more remote groups of storage nodes. Each remote group of storage nodes is allocated one or more unique error-correcting code chunks from the error-correcting code chunks. Any of the error-correcting code chunks not allocated to a remote group of storage nodes are allocated to the local group of storage nodes. Other implementations of this aspect include corresponding systems, apparatus, and computer program products.

Implementations can include any or all of the following features. Each remote group of storage nodes is allocated a same number of the error-correcting code chunks. Each data chunk is stored at a distinct storage node of the local group of storage nodes. Each error-correcting code chunk at each remote group of storage nodes is stored at a distinct storage node of the group of storage nodes. Each error-correcting code chunk and each data chunk is the same size. Each data chunk and each error-correcting code chunk is stored using an error-detecting code so that damaged chunks can be identified.

Generating the error-correcting code chunks includes using a minimum-distance separable (MDS) error-correcting code. The local group of storage nodes is a first data center and each of the remote groups of storages nodes is a distinct data center.

A number of error-correcting code chunks generated is based on the formula $((R-1)*d+R*c)$, where R is the total number of groups of storage nodes including the local group of storage nodes and the one or more remote groups of storage nodes, d is the number of data chunks, and c is a variable parameter related to a level of redundancy. Each remote group of storage nodes is allocated $(d+c)$ unique error correcting code chunks.

In a second aspect, a computer-implemented method includes generating a plurality of error-correcting code chunks using a plurality of data chunks. The error-correcting code chunks can be used to reconstruct one or more of the data chunks. The data chunks are allocated to each of two or more groups of storage nodes. The error-correcting code chunks are allocated between the two or more groups of storage nodes. Each group of storage nodes is allocated one or more unique error-correcting code chunks. Other implementations of this aspect include corresponding systems, apparatus, and computer program products.

Implementations can include any or all of the following features. Each group of storage nodes is allocated a same number of error-correcting code chunks. The number of error-correcting code chunks generated is based on the formula $(R*c)$, where R is the total number of groups of storage nodes, and c is a variable parameter related to a level of redundancy. Each group of storage nodes is allocated c unique error-correcting code chunks.

In a third aspect, a computer-implemented method includes identifying a damaged chunk of data. The damaged chunk is associated with a full stripe of d data chunks and one or more error-correcting code chunks (where d is greater than one). The damaged chunk is stored at a first storage node of a first group of storage nodes. h healthy chunks are identified at the first group of storage nodes. Each of the h healthy chunks is one of the d data chunks or the error-correcting code chunks of the full stripe. h is less than d, and h is greater than or equal to zero. (d−h) healthy chunks are identified among one or more second groups of storage nodes, where each of the second groups of storage nodes is distinct from the first group of storage nodes. Each of the (d−h) healthy chunks is a unique one of the d data chunks or error-correcting code chunks of the stripe. The damaged chunk is reconstructed using the identified healthy chunks. The reconstructed chunk is stored in an available storage node. Other implementations of this aspect include corresponding systems, apparatus, and computer program products.

Implementations can include any or all of the following features. A request for the damaged chunk is received. The storage nodes of the first group of storage nodes are periodically polled to determine whether any storage nodes are damaged. Identifying the damaged chunk of data includes using an error-detecting code. Reconstructing the damaged chunk includes using a minimum-distance separable (MDS) error-correcting code.

Particular embodiments of the invention can be implemented to realize one or more of the following advantages. Data can be stored, accessed, and maintained at groups of storage nodes while reducing either communication between groups or total storage space or both. Communication between groups can be reduced when a group (e.g., a "local" group) can be identified that receives more requests for data than other groups. In some cases, reliability can be greatly improved without increasing storage or costs associated with communication between groups.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
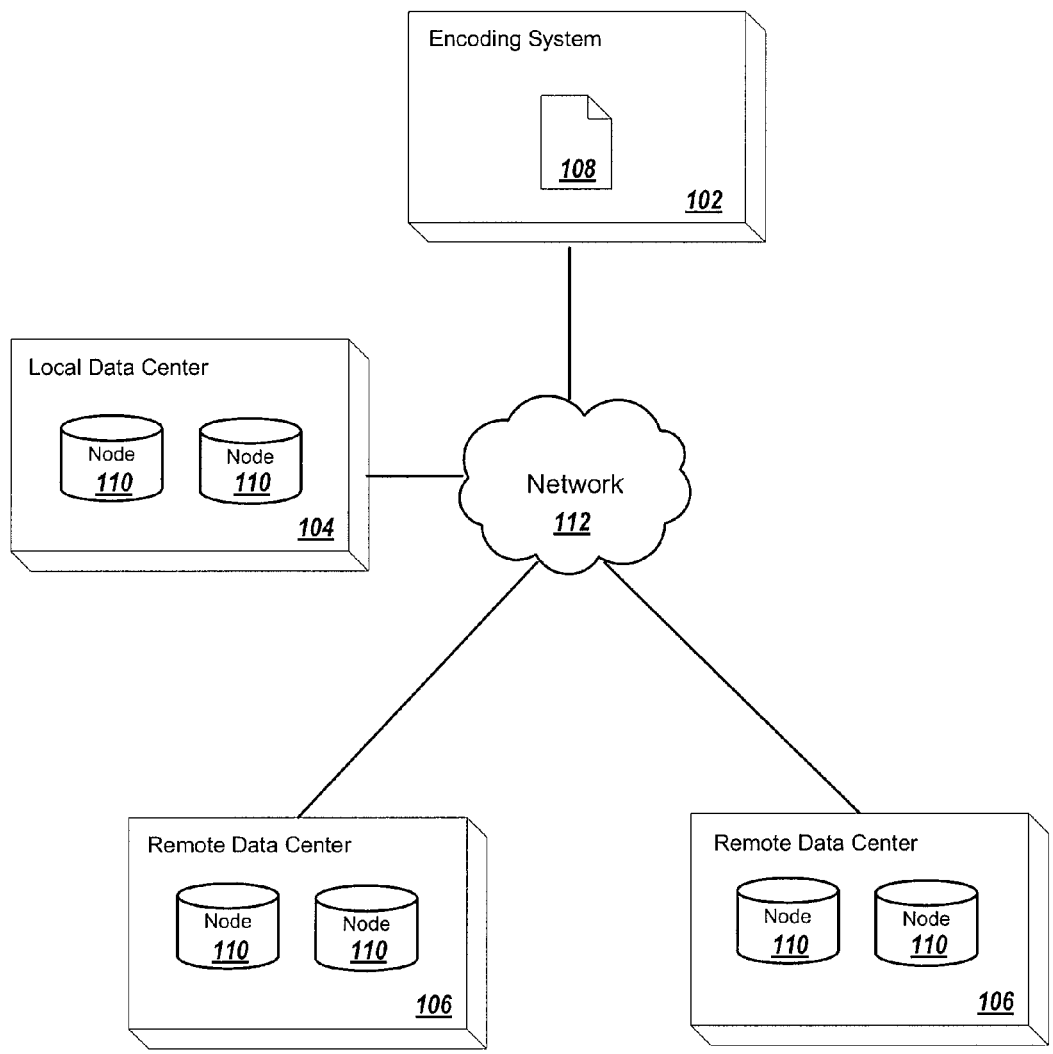
FIG. 1 is a schematic diagram of an example encoding system, an example local data center, and example remote data centers.

FIG. 1 is a diagram of an encoding system 102, a local data center 104, and remote data centers 106.

The encoding system 102 comprising one or more data processing apparatuses can store data from a file 108 across storage nodes 110 at the local data center 104 and the remote data centers 106. Redundant copies of the data and error-correcting codes can also be stored at storage nodes 110. The encoding system communicates with the local data center 104 and the remote data centers 106 using a network 112 (e.g., a local area network (LAN), a wide area network (WAN), a cellular network, the Internet, combinations of networks, and the like).

A storage node comprises one or more computer storage mediums. A computer storage medium can be, or be included in, a computer-readable storage device, a computer-readable storage substrate, a random or serial access memory array or device, or a combination of one or more of these. A computer storage medium can also be, or be included in, one or more separate physical components or media (e.g., multiple compact discs, disk drives, or other storage devices). In some implementations, a storage node is a data server, for example, a server including a data processing apparatus and a redundant array of independent disks (RAID) that can divide data among multiple hard disk drives. A group of storage nodes can include a rack, a subnetwork, a data center, or various other collections of servers or storage nodes.

A data center is a group of storage nodes. Typically, a data center is a facility with physical space for computer systems. In some implementations, data centers include telecommunication systems, backup power supplies, climate controls, security, and the like.

Increasing the reliability of stored data involves a trade-off between additional assurances and additional costs. For example, storing additional redundant copies of data requires more storage space at the storage nodes 110. Additional storage space can require, for example, more physical space in a data center, more electricity, more climate control, more money, and so on.

Increasing the reliability of stored data can also involve a trade-off between additional assurances and the time it takes to access or recover data (which can also be considered a cost). For example, in some implementations, the encoding system 102 can access data at the local data center 104 faster than it can access data at the remote data centers 106 (e.g., because the remote data centers are on a network with more traffic or less bandwidth or both, or are physically further away, or for other reasons.) Thus recovery of damaged data takes more time when data at the remote data centers 106 needs to be accessed more frequently.

In another example, communication between storage nodes in a data center is typically less expensive (e.g., faster, or requiring less money, or the like) than communication between data centers. Thus recovery of damaged data takes more time when data centers need to communicate between each other than when data can be recovered at a single data center.

In some implementations, failures of storage nodes within a data center are correlated (e.g., because failures occur when power is lost to the whole data center, a hurricane strikes the data center, or the like), while failures between storage nodes in different data centers are uncorrelated or weakly correlated. Consequently, data is generally stored using techniques that tolerate at least the loss of a single data center (that is, using techniques that can recover data despite an entire data center failing.)

In some implementations, metadata is used at the encoding system 102 or the data centers 104 and 106 or both to keep track of data. For example, the metadata can specify which parts of a file are stored at which data centers, where redundant copies of data are stored, and the like.

Figure 2:
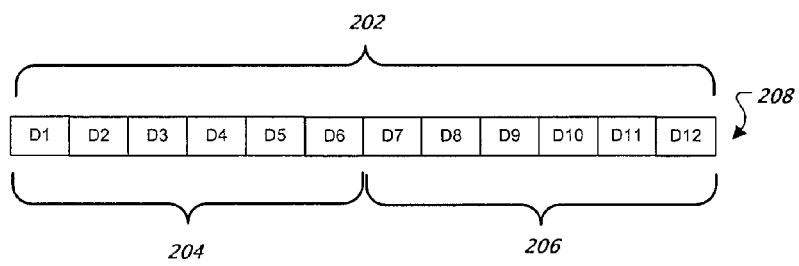
FIG. 2 is an illustration of an example file comprising partial stripes and of data chunks.

FIG. 2 is an illustration of an example file 202 comprising partial stripes 204 and 206 of data chunks 208. A data chunk is a specified amount of data. In some implementations, a data chunk is a contiguous portion of data from a file. In other implementations, a data chunk is one or more non-continuous portions of data from a file. For example, a data chunk can be 256 bytes or other units of data. In FIGS. 2-4, data chunks are illustrated as squares and labeled with the letter "D" and a number. The number indicates the position of the data chunk in the file 202. For example, "D1" indicates the first data chunk in the file 202. Where multiple squares are shown with the same label (e.g., "D1"), all of those squares represent data chunks with the same data corresponding to a data chunk (e.g., for "D1" the first data chunk) in the file 202.

A partial stripe is a specified number of data chunks. For example, the partial stripes 204 and 206 of the example file 202 have six data chunks. Any file or any amount of data can be divided into partial stripes of data chunks.

Figure 3A:
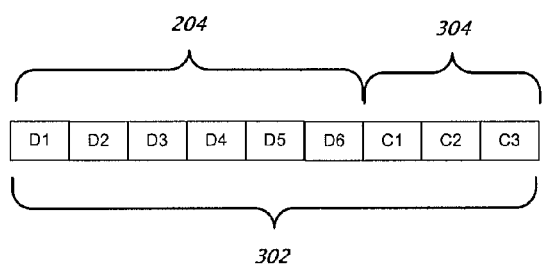
FIG. 3A is an illustration of an example full stripe comprising a partial stripe of data chunks and error-correcting code chunks.

FIG. 3A is an illustration of an example full stripe 302 comprising a partial stripe 204 of data chunks and error-correcting code chunks 304. A full stripe comprises a partial stripe and one or more error-correcting code chunks. For example, the depicted full stripe 302 includes the partial stripe 204 from FIG. 2 and three error-correcting code chunks 304. An error-correcting code chunk ("code chunk" hereinafter) comprises a chunk of data based on one or more data chunks of a partial stripe. In some implementations, each code chunk in a full stripe is the same specified size (e.g., 256 bytes) as the data chunks.

The letter "d" is used in this specification to refer to the number of data chunks in a partial stripe or a full stripe. The letter "c" is used in this specification to refer to a variable parameter related to a level of redundancy. In some implementations, c is the number of code chunks in a full stripe. In other implementations, the number of code chunks is based on c.

The code chunks are generated using an error-correcting code. In some implementations, generating the code chunks comprises using a minimum-distance separable (MDS) code. Examples of MDS codes include Reed-Solomon codes. Various techniques can be used to generate the code chunks.

In general, any error-correcting code can be used that can reconstruct d data chunks for any set of d unique, healthy chunks (either data chunks or code chunks) out of a full stripe. When such an error-correcting code is used, any number of failures up to the total number of code chunks in a full stripe can be tolerated—the full stripe can be reconstructed using the healthy chunks.

A damaged chunk is a chunk containing one or more errors. Typically, a damaged chunk is identified using an error-detecting code. For example, a damaged chunk can be completely erased (e.g., if the chunk was stored in a hard drive destroyed in a hurricane), or a damaged chunk can have a single bit flipped. A healthy chunk is a chunk that is not damaged.

For example, in the full stripe 302 depicted in FIG. 3A, if data chunks D1, D2, and D3 are damaged, those data chucks can be reconstructed using the error-correcting code, data chunks D4, D5, and D6, and code chunks C1, C2, and C3. Data is only lost when there are greater than three damaged chunks.

Figure 3B:
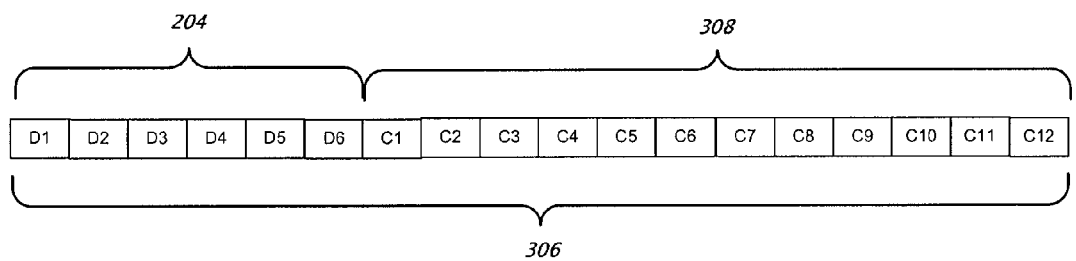
FIG. 3B is an illustration of an example full stripe comprising a partial stripe of data chunks and error-correcting code chunks.

FIG. 3B is an illustration of an example full stripe 306 comprising a partial stripe 204 of data chunks and error-correcting code chunks 308. The example full stripe 306 has 12 code chunks. The entire example full stripe 306 can be regenerated as long as any six chucks (code chunks or data chunks) are healthy. Consequently, data is only lost when there are more than 12 damaged chunks.

For purposes of illustration, suppose the entire partial stripe 204 is damaged (each of data chunks D1-D6 is damaged). The full stripe 306 can be reconstructed using any six of the healthy remaining chunks (e.g., C1-C6, or C7-C12, or C1, C3, C5, C7, C9, and C11).

In some implementations, where the chunks in a full stripe are being allocated to groups of storage nodes, the number of code chunks generated is based on the formula $((R-1)*d+R*c)$, where R is the total number of groups of storage nodes. For example, in FIG. 3B, if c=3 (as it did for the example full stripe 302 in FIG. 3A) and R=2 (the chunks are being allocated to two groups of storage nodes, e.g., two data centers), then the result of the formula specifies that a total of 12 code chunks are generated. The 18 total chunks (six data chunks and 12 code chunks) can be allocated evenly to the two groups of storage nodes (nine chunks to each group).

Figure 3C:
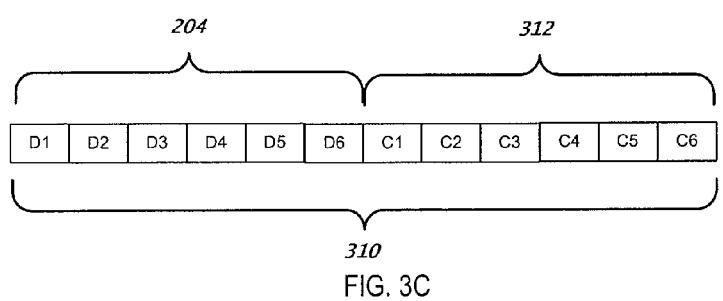
FIG. 3C illustrates an example full stripe comprising a partial stripe of data chunks and error-correcting code chunks.

FIG. 3C illustrates an example full stripe 310 comprising a partial stripe 204 of data chunks and error-correcting code chunks 312. The example full stripe 310 has six code chunks. The entire example full stripe 310 can be regenerated as long as any six chunks (code chunks or data chunks) are healthy. Consequently, data is only lost when there are more than six failures.

In some implementations, where the chunks in a full stripe are being allocated to groups of storage nodes, the number of code chunks generated is based on the formula $R*c$, where R is the total number of groups of storage nodes. For example, in FIG. 3C, if c=3 (as it did for the example full stripe 302 in FIG. 3A) and R=2 (the chunks are being allocated to two groups of storage nodes, e.g., two data centers), then the result of the formula specifies that a total of six code chunks are generated.

Figure 4A:
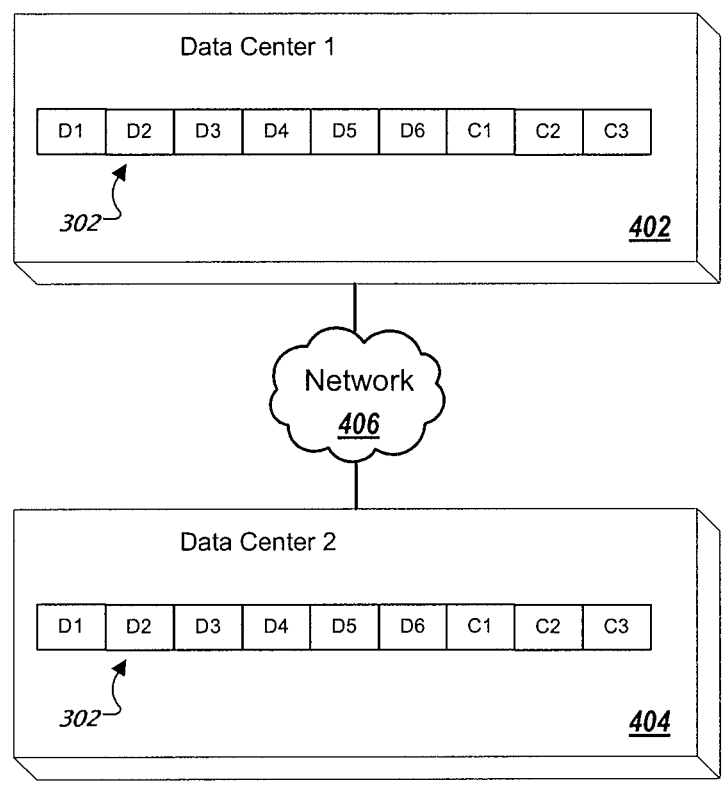
FIG. 4A is a diagram showing two example data centers that can communicate using a network.

FIG. 4A is a diagram showing two example data centers 402 and 404 that can communicate using a network 406. FIG. 4A illustrates an example possibility for how to store and maintain the example full stripe 302 illustrated in FIG. 3A. Identical copies of the full stripe 302 are allocated to each data center 402 and 404. In some implementations, each chunk is stored at a distinct storage node at each data center.

For purposes of illustration, suppose that data chunks D1-D3 are damaged at the first data center 402. To minimize communication between the data centers 402 and 404, the first data center 402 can reconstruct the full stripe 302 using the healthy remaining chunks, D4-D6 and C1-C3. Alternatively, the first data center 402 can retrieve the copies of D1-D3 from the second data center 404 (e.g., this can be done to minimize the amount of processing resources used for reconstruction).

For further illustration, suppose that data chunks D1-D4 are damaged at the first data center 402, so that only five healthy chunks remain (D5, D6, and C1-C3). In that case, the first data center 402 cannot reconstruct the full stripe 302 using only the healthy chunks at the first data center 402. Nonetheless, the first data center 402 can retrieve the copies of D1-D4 from the second data center 404.

For an additional illustration, suppose that data chunks D1-D4 are damaged at the first data center 402 and that data chunk D6 and code chunks C1-C3 are damaged at the second data center 404. The first data center 402 cannot reconstruct the full stripe 302 using its healthy chunks, and the second data center 404 cannot reconstruct the full stripe 302 using its healthy chunks.

Nonetheless, the first data center 402 can retrieve a healthy chunk (any chunk from D1-D4) from the second data center 404, and it can then reconstruct the full stripe 302. Similarly, the second data center 404 can retrieve a healthy chunk (any one from D6 or C1-C3) from the first data center 402 and reconstruct the full stripe 302.

For a last illustration, suppose that data chunks D1-D4 are damaged at both data centers 402 and 404. In that case, the first data center 402 cannot reconstruct the full stripe 302 using its healthy chunks. The second data center 404 cannot reconstruct the full stripe 302 using its healthy chunks. Consequently, the data centers 402 and 404 cannot reconstruct the full stripe 302 without additional information.

Figure 4B:
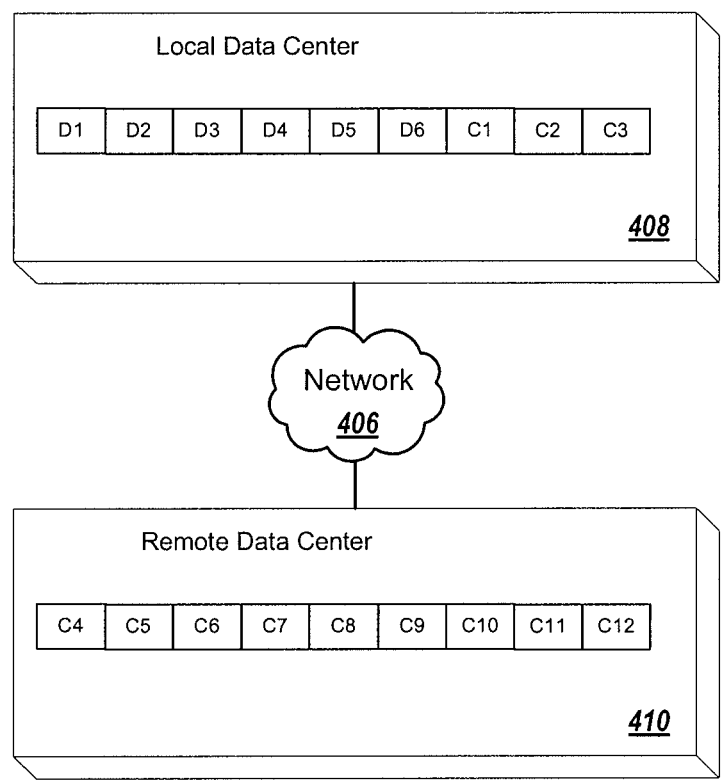
FIG. 4B is a diagram showing an example local data center and an example remote data center that can communicate using a network.

FIG. 4B is a diagram showing an example local data center 408 and an example remote data center 410 that can communicate using a network 406. FIG. 4B illustrates an example possibility for how to store and maintain the example full stripe 306 illustrated in FIG. 3B.

The data chunks are allocated to the local data center 408. The code chunks are allocated between the local data center 408 and the remote data center 410. Each data center has the same total number of chunks. In some implementations, each chunk is stored at a distinct storage node at each data center.

For purposes of illustration, suppose that data chunks D1-D3 are damaged at the local data center 408 and code chunks C4-C6 are damaged at the remote data center 410. The local data center 408 can reconstruct the full stripe 306 (and hence the damaged data chunks) using its healthy chunks, so no between-group communication costs are incurred. Similarly, the remote data 410 center can reconstruct the full stripe 306 using its healthy chunks without between-group communication.

For further illustration, suppose that data chunks D1-D4 are damaged at the local data center 408 and code chunks C4-C7 are damaged at the remote data center 410. The local data center 408 cannot reconstruct the full stripe 306 using its healthy chunks, and the remote data center 410 cannot reconstruct the full stripe 306 using its healthy chunks.

Nonetheless, the local data center 408 can retrieve a healthy chunk (any chunk from C8-C12) from the remote data center 410, and it can then reconstruct the full stripe 306. Similarly, the remote data center 410 can retrieve a healthy chunk (any one from D5-D6 or C1-C3) from the local data center 408 and reconstruct the full stripe 306.

An advantage to the example allocation of chunks illustrated in FIG. 4B is that the full stripe 306 can be reconstructed even if a large number of chunks (12 total) are damaged. Nonetheless, the remote data center 410 does not have the data chunks immediately available. If the remote data center 410 receives a request for the data chunks, it can reconstruct them using its code chunks (e.g., to minimize the costs of communicating between data centers), or forward the request to the local data center 408 (e.g., to minimize usage of processing resources) and retrieve the data chunks from the local data center 408. If the local data center 408 receives a request for the data chunks, it can serve them directly from its storage nodes. Consequently, this example allocation is generally suitable where more data requests go to the local data center 408 than to the remote data center 410.

Figure 4C:
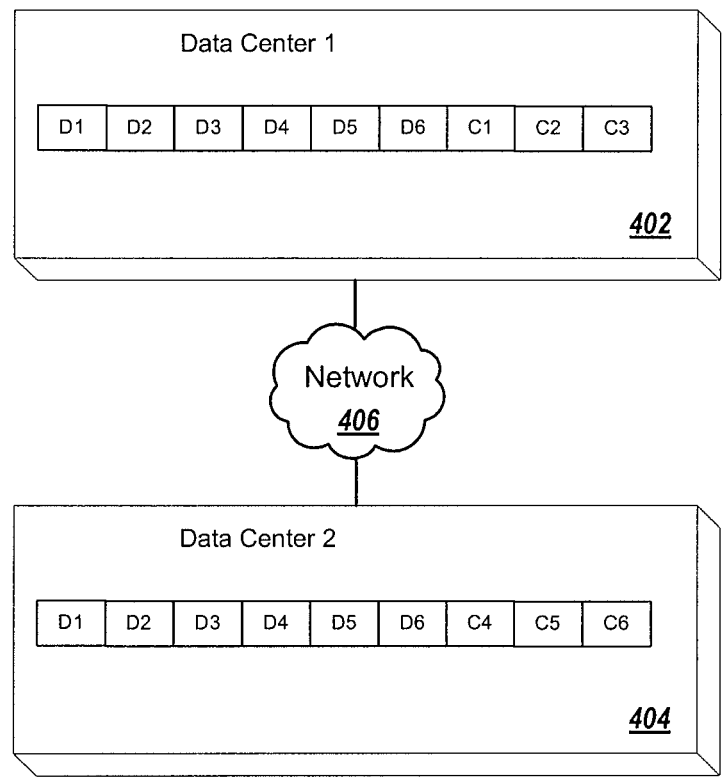
FIG. 4C is a diagram showing an example first data center and an example second data center that can communicate using a network.

FIG. 4C is a diagram showing an example first data center 402 and an example second data center 404 that can communicate using a network 406. FIG. 4C illustrates an example possibility for how to store and maintain the example full stripe 310 illustrated in FIG. 3C.

The data chunks are allocated to both the first data center 402 and the second data center 404. The code chunks are allocated between the first data center 402 and the second data center 404. Each data center has the same total number of chunks. In some implementations, each chunk is stored at a distinct storage node at each data center.

For purposes of illustration, suppose that data chunks D1-D3 are damaged at the first data center 402 and code chunks C4-C6 are damaged at the second data center 404. The first data center 402 can reconstruct the full stripe 306 using its healthy chunks, so no between-group communication costs are incurred. Similarly, the second data center 404 can reconstruct the full stripe 306 using its healthy chunks without between-group communication.

For further illustration, suppose that data chunks D1-D4 are damaged at both the first data center 402 and the second data center 404. The first data center 402 cannot reconstruct the full stripe 310 using its healthy chunks, and the second data center 404 cannot reconstruct the full stripe 310 using its healthy chunks.

Even so, the first data center 402 can retrieve a healthy chunk (any chunk from C4-C6, but not D5 or D6 because it already has those chunks) from the second data center 404, and it can then reconstruct the full stripe 310. Similarly, the second data center 404 can retrieve a healthy chunk (any one from C1-C3, but not D5 or D6 because it already has those) from the first data center 402 and reconstruct the full stripe 310.

Figure 5:
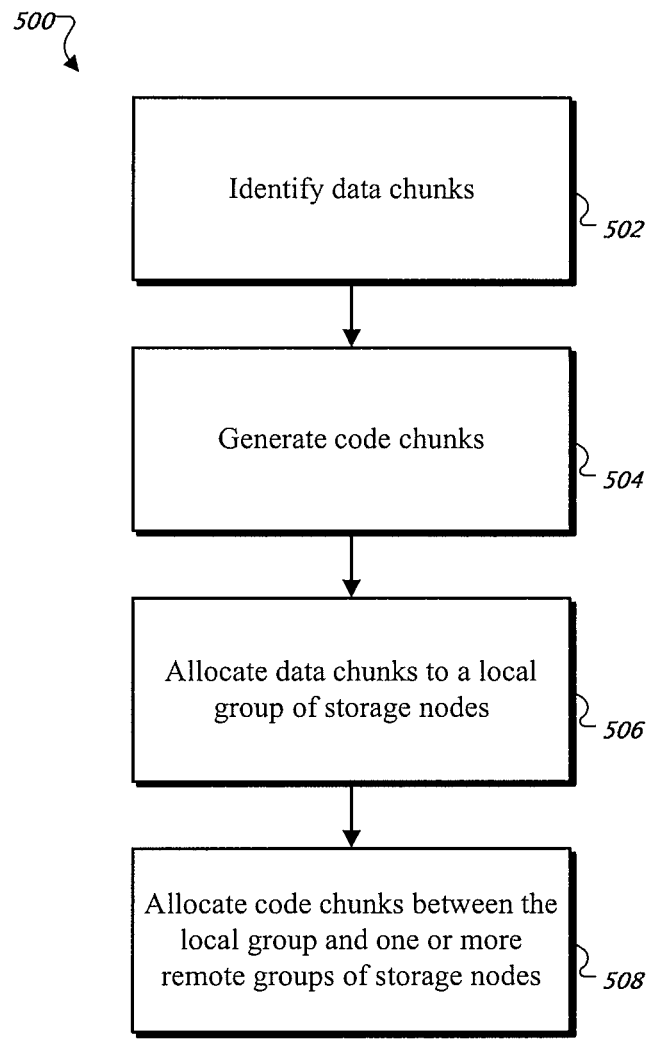
FIG. 5 is a flow diagram of an example technique for storing data at groups of storage nodes.

FIG. 5 is a flow diagram of an example technique 500 for storing data at groups of storage nodes. In some implementations, the technique 500 is performed by a system, for example, encoding system 102, or a system in a local data center 104, or the like. For purposes of illustration, the technique 500 will be described with respect to a system that performs the technique 500. The technique 500 can be used, for example, to achieve the example allocation of code chunks and data chunks between the data centers illustrated in FIG. 4B.

The system identifies data chunks (step 502). For example, the data chunks can be from a partial stripe of data. Typically, the system receives the data chunks with a request to store the data chunks.

The system generates code chunks using the data chunks (step 504). For example, the code chunks can be generated using an MDS code. In some implementations, the number of code chunks generated is based on the formula $((R-1)*d + R*c)$, where R is the total number of groups of storage nodes. Typically, each code chunk and each data chunk are the same size (e.g., the same number of bytes).

The system allocates the data chunks to a local group of storage nodes (step 506). In some implementations, allocating the data chunks comprises sending them to the local group. The local group can be, for example, a data center, a group of servers in a data center, an array of hard drives, or the like. In some implementations, each data chunk is stored at a distinct storage node of the local group of storage nodes. In various implementations, each data chunk is stored using an error-detecting code so that damaged chunks can be identified. For example, each data chunk can be stored with a CRC.

The system allocates the code chunks between the local group of storage nodes and one or more remote groups of storage nodes (step 508). In some implementations, the local group of storage nodes is a first data center and each of the remote groups of storage nodes is a distinct data center.

Each remote group of storage nodes is allocated one or more unique code chunks from the code chunks generated in step 504. The code chunks are unique because they were created using an error-correcting code specifying a number of unique code chunks.

Each remote group of storage nodes is allocated the same number of code chunks. Any of the code chunks not allocated to a remote group of storage nodes are allocated to the local group of storage nodes (in addition to the data chunks).

In some implementations, each code chunk at each remote group of storage nodes is stored at a distinct storage node. In various implementations, each code chunk is stored using an error detecting code so that damaged chunks can be identified. For example, each code chunk can be stored with a CRC.

In some implementations, for example where the technique 500 is performed by an encoding system (e.g., encoding system 102), allocating data or code chunks includes sending those chunks to the group of storage nodes that is allocated the chunks. For example, the encoding system can generate all of the code chunks, and then send each allocated code chunk to its allocated group of storage nodes.

In some other implementations, each group of storage nodes generates its allocated code chunks after receiving the data chunks (or d chunks of either data or code chunks). For example, the data chunks can be sent to each of the remote groups of storage nodes. Then each remote group of storage nodes can generate its allocated code chunks (e.g., by reconstructing an entire full stripe using an error-correcting code and retaining only its allocated code chunks). These implementations can be useful, for instance, where remote communication is expensive and each group of storage nodes is allocated more code chunks than there are data chunks.

Figure 6:
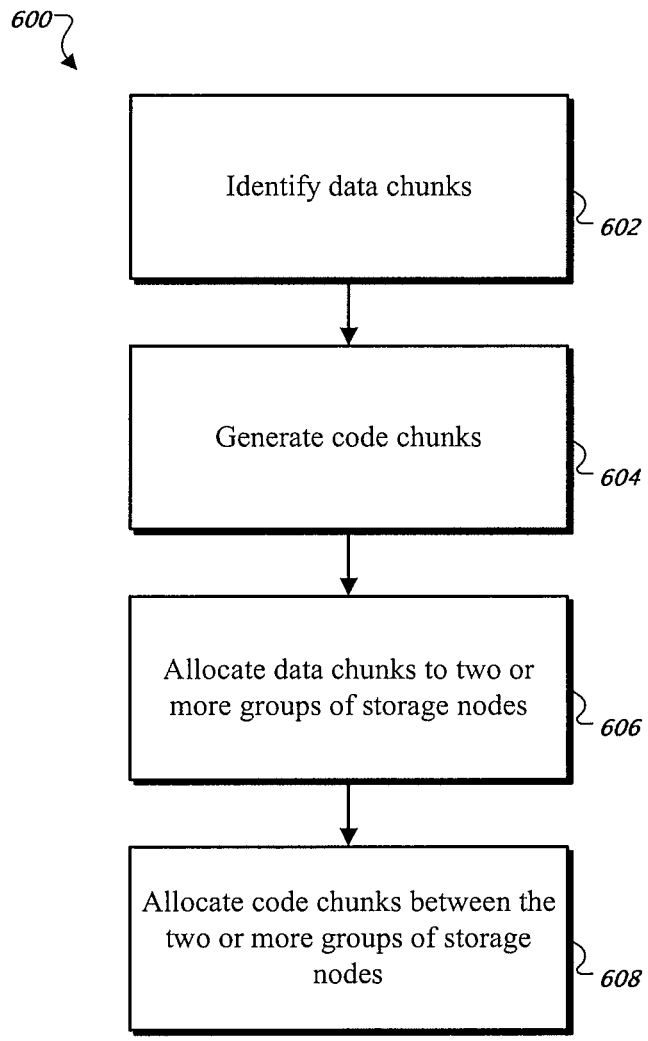
FIG. 6 is a flow diagram of an example technique for storing data at groups of storage nodes.

FIG. 6 is a flow diagram of an example technique 600 for storing data at groups of storage nodes. In some implementations, the technique 600 is performed by a system, for example, encoding system 102, or a system in a data center, or the like. For purposes of illustration, the technique 600 will be described with respect to a system that performs the technique 600. The technique 600 can be used, for example, to achieve the example allocation of code chunks and data chunks between the data centers illustrated in FIG. 4C.

The system identifies data chunks (step 602). The system generates code chunks using the data chunks (step 604). In some implementations, the number of code chunks generated is based on the formula (R*c), where R is the total number of groups of storage nodes.

The system allocates the data chunks to each of two or more groups of storage nodes (step 606). Typically, the data chunks are sent to each group of storage nodes. The system allocates the code chunks between the groups of storage nodes (step 608). In some implementations, each group of storage nodes is a distinct data center.

Each group of storage nodes is allocated one or more unique code chunks from the code chunks generated in step 604 (step 608). In some implementations, the system generates the code chunks and sends the allocated code chunks to the groups of storage nodes. In some other implementations, each group of storage nodes generates its allocated code chunks. For example, each group can reconstruct a full stripe using the data chunks allocated to it, and then retain its allocated code chunks. Each remote group of storage nodes is allocated the same number of code chunks.

Figure 7:
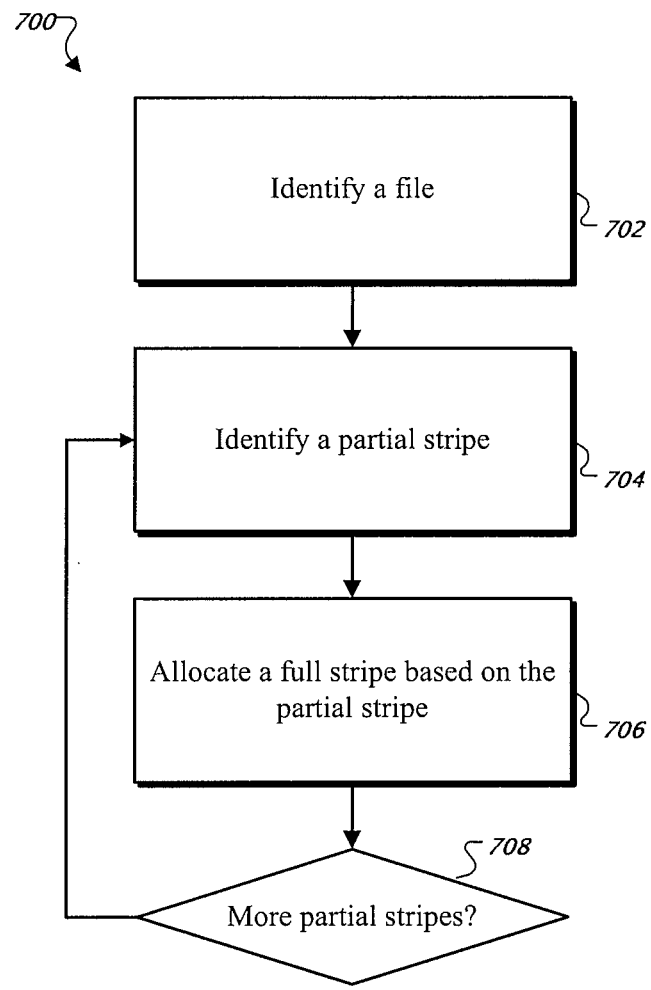
FIG. 7 is a flow diagram of a technique for storing a file at groups of storage nodes.

FIG. 7 is a flow diagram of a technique 700 for storing a file at groups of storage nodes. In some implementations, the technique 700 is performed by a system, e.g., encoding system 102, or a system at a data center. For purposes of illustration, the technique 700 will be described with respect to a system.

The system identifies the file (step 702). A file is a collection of data. The system identifies a partial stripe of data chunks in the file (step 704). Typically the system starts at the beginning of the file and works through the file one partial stripe at a time.

The system allocates a full stripe (based on the partial stripe) to the groups of storage nodes (step 706). For example, the technique 500 described in FIG. 5 can be used, or the technique 600 described in FIG. 6 can be used. If there are more partial stripes in the file (step 708), the system repeats for the additional partial stripes (repeat steps 704 and 706).

Figure 8:
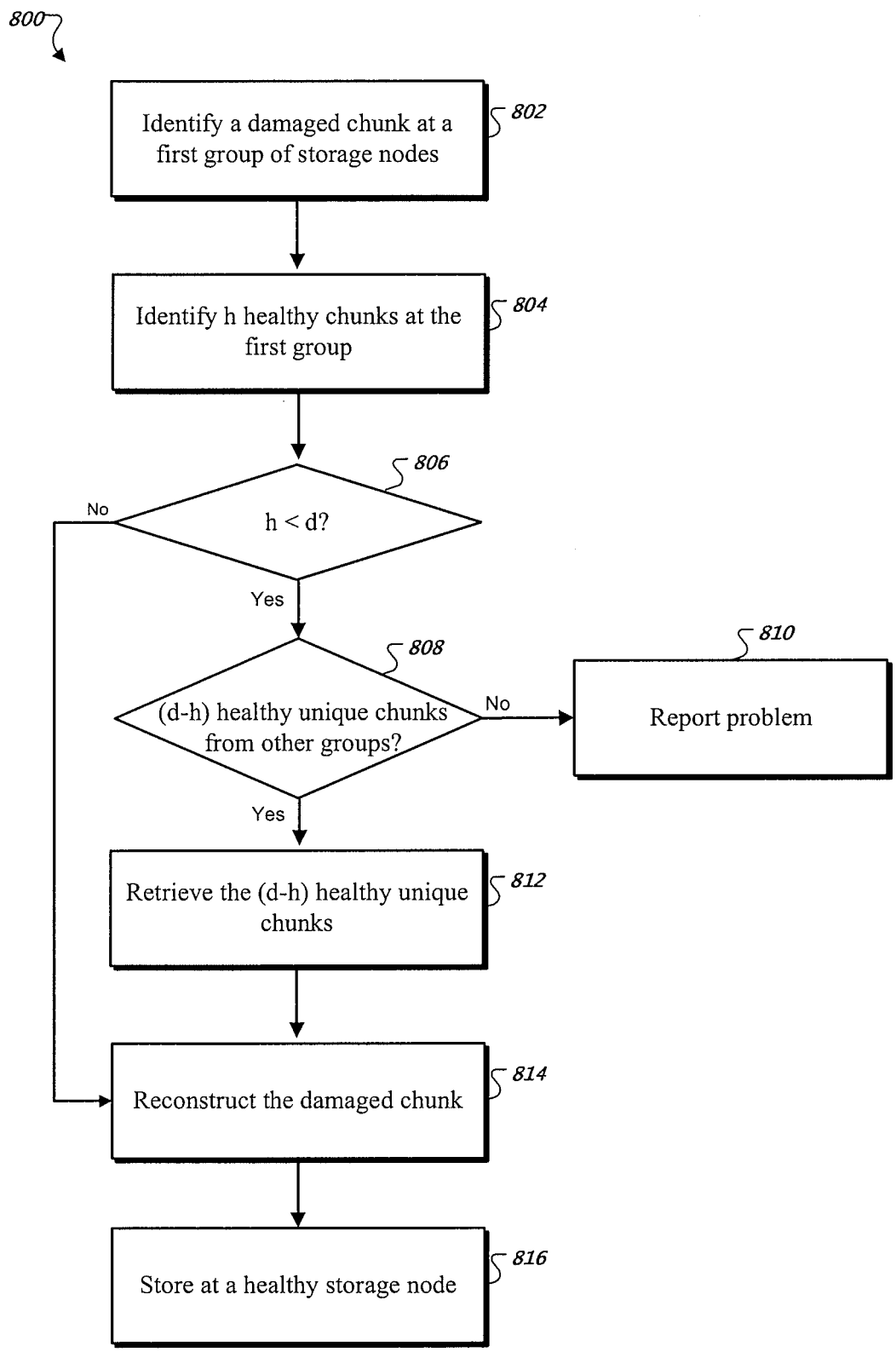
FIG. 8 is a flow diagram of a technique for data access and maintenance.

FIG. 8 is a flow diagram of a technique 800 for data access and maintenance. In some implementations, the technique 800 is performed by a system, e.g., encoding system 102, or a system at a data center. For purposes of illustration, the technique 800 will be described with respect to a system.

The system identifies a damaged chunk of data (step 802). The damaged chunk is associated with a full stripe of data including d data chunks (d>1) and one or more code chunks. The damaged chunk is stored at a first storage node of a first group of storage nodes. In some implementations, identifying the damaged chunk of data includes using an error-detecting code.

In some cases, the system identifies the damaged chunk when the system receives a request for the damaged chunk. In some other cases, the system identifies the damaged chunk while periodically polling the storage nodes of the first group of storage nodes to determine whether any storage nodes are damaged. In some other cases, the system identifies the damaged chunk after receiving notification of a problem, for example, a power failure, a hard drive failure, a memory error, or the like.

The system identifies h healthy chunks (h>=0) of the full stripe associated with the damaged chunk at the first group of storage nodes (step 804). The system identifies both healthy data chunks and healthy code chunks. In some cases, there are no healthy chunks at the first group of storage nodes. In some implementations, identifying healthy chunks includes using an error-detecting code.

The system determines whether h<d (step 806). If h>=d, then there are d healthy chunks at the first group of storage nodes, and the first group of storage nodes can reconstruct the damaged chunk (step 814) without communicating with any other groups of storage nodes.

If h<d, the system determines whether (d−h) healthy, unique chunks are available from one or more second groups of storage nodes (step 808). In some implementations, the system polls each group of storage nodes to determine which chunks of the full stripe are available and healthy.

If (d−h) healthy, unique chunks are not available from the second groups of storage nodes, then the system can search for healthy chunks at other locations. In some implementations, the system is unable to reconstruct the damaged chunk. In some implementations, the system reports a problem (e.g., by sending a message to an encoding system 102, sending a message that a requested chunk is not available, displaying an error message on a display device, or the like) (step 810).

If (d−h) healthy, unique chunks are available from the second groups of storage nodes, then the system retrieves the (d−h) healthy, unique chunks (step 812). The system reconstructs the damaged chunk (step 814). In some implementations, reconstructing the damaged chunk includes using an MDS code.

The system stores the reconstructed chunk in an available storage node (step 816). In some cases, the reconstructed chunk is stored in the first storage node. In some other cases, the first storage node is suspected to be damaged and the reconstructed chunk is stored in another storage node.

Figure 9:
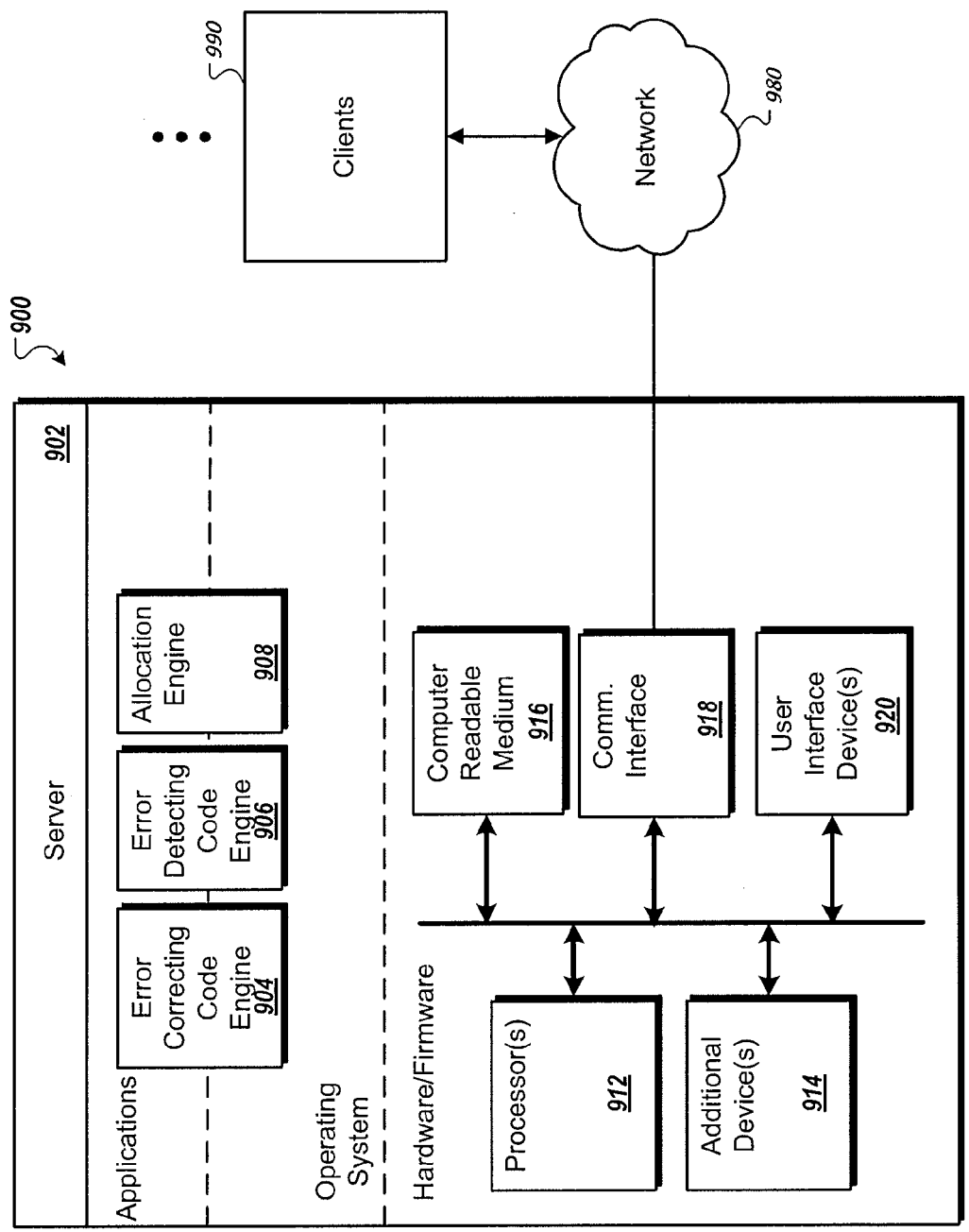
FIG. 9 is a schematic diagram of an example system configured for data storage, access, and maintenance.

FIG. 9 is a schematic diagram of an example system configured for data storage, access, and maintenance. The system generally consists of a server 902. The server 902 is optionally connected to one or more user or client computers 990 through a network 980. The server 902 consists of one or more data processing apparatus. While only one data processing apparatus is shown in FIG. 9, multiple data processing apparatus can be used. The server 902 includes various modules, e.g. executable software programs, including an error correcting code engine 904 for generating code chunks and reconstructing damaged chunks. An error-detecting code engine 906 is configured to identify damaged chunks of data. An allocation engine 908 allocates code chunks and data chunks between one or more groups of storage nodes.

Each module runs as part of the operating system on the server 902, runs as an application on the server 902, or runs as part of the operating system and part of an application on the server 902, for instance. Although several software modules are illustrated, there may be fewer or more software modules. Moreover, the software modules can be distributed on one or more data processing apparatus connected by one or more networks or other suitable communication mediums.

The server 902 also includes hardware or firmware devices including one or more processors 912, one or more additional devices 914, a computer readable medium 916, a communication interface 918, and optionally one or more user interface devices 920. Each processor 912 is capable of processing instructions for execution within the server 902. In some implementations, the processor 912 is a single or multi-threaded processor. Each processor 912 is capable of processing instructions stored on the computer readable medium 916 or on a storage device such as one of the additional devices 914. The server 902 uses its communication interface 918 to communicate with one or more computers 990, for example, over a network 980.

In some implementations, the server 902 does not have any user interface devices. In other implementations, the server 902 includes one or more user interface devices. Examples of user interface devices 920 include a display, a camera, a speaker, a microphone, a tactile feedback device, a keyboard, and a mouse. The server 902 can store instructions that implement operations associated with the modules described above, for example, on the computer readable medium 916 or one or more additional devices 914, for example, one or more of a floppy disk device, a hard disk device, an optical disk device, or a tape device.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
generating a plurality of error-correcting code chunks from a plurality of data chunks, wherein the error-correcting code chunks can be used to reconstruct one or more of the data chunks;
allocating the data chunks to a local group of storage nodes; and
allocating the error-correcting code chunks between the local group of storage nodes and one or more remote groups of storage nodes, where:
each remote group of storage nodes is allocated one or more unique error-correcting code chunks from the error-correcting code chunks;
any of the error-correcting code chunks not allocated to a remote group of storage nodes are allocated to the local group of storage nodes.

2. The method of claim 1, where:
each remote group of storage nodes is allocated a same number of the error-correcting code chunks.

3. The method of claim 1, where:
each data chunk is stored at a distinct storage node of the local group of storage nodes; and
each error-correcting code chunk at each remote group of storage nodes is stored at a distinct storage node of the group of storage nodes.

4. The method of claim 1, where each error-correcting code chunk and each data chunk is the same size.

5. The method of claim 1, where each data chunk and each error-correcting code chunk is stored using an error-detecting code so that damaged chunks can be identified.

6. The method of claim 1, where generating the error-correcting code chunks includes using a minimum-distance separable (MDS) error-correcting code.

7. The method of claim 1, where the local group of storage nodes is a first data center and each of the remote groups of storages nodes is a distinct data center.

8. The method of claim 1, where:
generating the plurality of error-correcting code chunks comprises generating the plurality of code chunks so that the total number of error-correcting code chunks generated is based on the formula $((R-1)*d+R*c)$, where R is the total number of groups of storage nodes including the local group of storage nodes and the one or more remote groups of storage nodes, d is the number of data chunks, and c is a variable parameter related to a level of redundancy; and
each remote group of storage nodes is allocated $(d+c)$ unique error-correcting code chunks.

9. A computer-implemented method comprising:
generating a plurality of error-correcting code chunks using a plurality of data chunks, wherein the error-correcting code chunks can be used to reconstruct one or more of the data chunks;
allocating the data chunks to each of two or more groups of storage nodes so that each of the two or more groups of storage nodes stores all of the data chunks; and
allocating the error-correcting code chunks between the two or more groups of storage nodes, where:
each group of storage nodes is allocated one or more unique error-correcting code chunks.

10. The method of claim 9, where:
each group of storage nodes is allocated a same number of error-correcting code chunks.

11. The method of claim 9, where:
generating the plurality of error-correcting code chunks comprises generating the plurality of code chunks so that the total number of error-correcting code chunks generated is based on the formula $(R*c)$, where R is the total number of groups of storage nodes, and c is a variable parameter related to a level of redundancy; and
each group of storage nodes is allocated c unique error-correcting code chunks.

12. A computer storage medium device encoded with a computer program, the program comprising instructions that when executed by data processing apparatus cause the data processing apparatus to perform operations comprising:

generating a plurality of error-correcting code chunks from a plurality of data chunks, wherein the error-correcting code chunks can be used to reconstruct one or more of the data chunks;

allocating the data chunks to a local group of storage nodes; and allocating the error-correcting code chunks between the local group of storage nodes and one or more remote groups of storage nodes, where:

each remote group of storage nodes is allocated one or more unique error-correcting code chunks from the error-correcting code chunks;

any of the error-correcting code chunks not allocated to a remote group of storage nodes are allocated to the local group of storage nodes.

13. The computer program product of claim 12, where:
each remote group of storage nodes is allocated a same number of the error-correcting code chunks.

14. The computer program product of claim 12, where:
each data chunk is stored at a distinct storage node of the local group of storage nodes; and
each error-correcting code chunk at each remote group of storage nodes is stored at a distinct storage node of the group of storage nodes.

15. The computer program product of claim 12, where each error-correcting code chunk and each data chunk is the same size.

16. The computer program product of claim 12, where each data chunk and each error-correcting code chunk is stored using an error-detecting code so that damaged chunks can be identified.

17. The computer program product of claim 12, where generating the error-correcting code chunks includes using a minimum-distance separable (MDS) error-correcting code.

18. The computer program product of claim 12, where the local group of storage nodes is a first data center and each of the remote groups of storages nodes is a distinct data center.

19. The computer program product of claim 12, where:
generating the plurality of error-correcting code chunks comprises generating the plurality of code chunks so that the total number of error-correcting code chunks generated is based on the formula $((R-1)*d+R*c)$, where R is the total number of groups of storage nodes including the local group of storage nodes and the one or more remote groups of storage nodes, d is the number of data chunks, and c is a variable parameter related to a level of redundancy; and
each remote group of storage nodes is allocated $(d+c)$ unique error-correcting code chunks.

20. A computer storage device encoded with a computer program, the program comprising instructions that when executed by data processing apparatus cause the data processing apparatus to perform operations comprising:

generating a plurality of error-correcting code chunks using a plurality of data chunks, wherein the error-correcting code chunks can be used to reconstruct one or more of the data chunks;

allocating the data chunks to each of two or more groups of storage nodes so that each of the two or more groups of storage nodes stores all of the data chunks; and allocating the error-correcting code chunks between the two or more groups of storage nodes, where:

each group of storage nodes is allocated one or more unique error-correcting code chunks.

21. The computer program product of claim 20, where:
each group of storage nodes is allocated a same number of error-correcting code chunks.

22. The computer program product of claim 20, where:
generating the plurality of error-correcting code chunks comprises generating the plurality of code chunks so that the total number of error-correcting code chunks generated is based on the formula $(R*c)$, where R is the total number of groups of storage nodes, and c is a variable parameter related to a level of redundancy; and
each group of storage nodes is allocated c unique error-correcting code chunks.

23. A system comprising a processor and memory configured to interact and perform operations comprising:

generating a plurality of error-correcting code chunks from a plurality of data chunks, wherein the error-correcting code chunks can be used to reconstruct one or more of the data chunks;

allocating the data chunks to a local group of storage nodes; and allocating the error-correcting code chunks between the local group of storage nodes and one or more remote groups of storage nodes, where:

each remote group of storage nodes is allocated one or more unique error-correcting code chunks from the error-correcting code chunks;

any of the error-correcting code chunks not allocated to a remote group of storage nodes are allocated to the local group of storage nodes.

24. The system of claim 23, where:
each remote group of storage nodes is allocated a same number of the error-correcting code chunks.

25. The system of claim 23, where:
each data chunk is stored at a distinct storage node of the local group of storage nodes; and
each error-correcting code chunk at each remote group of storage nodes is stored at a distinct storage node of the group of storage nodes.

26. The system of claim 23, where each error-correcting code chunk and each data chunk is the same size.

27. The system of claim 23, where each data chunk and each error-correcting code chunk is stored using an error-detecting code so that damaged chunks can be identified.

28. The system of claim 23, where generating the error-correcting code chunks includes using a minimum-distance separable (MDS) error-correcting code.

29. The system of claim 23, where the local group of storage nodes is a first data center and each of the remote groups of storages nodes is a distinct data center.

30. The system of claim 23, where:
generating the plurality of error-correcting code chunks comprises generating the plurality of code chunks so that the total number of error-correcting code chunks generated is based on the formula $((R-1)*d+R*c)$, where R is the total number of groups of storage nodes including the local group of storage nodes and the one or more remote groups of storage nodes, d is the number of data chunks, and c is a variable parameter related to a level of redundancy; and
each remote group of storage nodes is allocated $(d+c)$ unique error-correcting code chunks.

31. A system comprising a processor and memory configured to interact and perform operations comprising:

generating a plurality of error-correcting code chunks using a plurality of data chunks, wherein the error-correcting code chunks can be used to reconstruct one or more of the data chunks;

allocating the data chunks to each of two or more groups of storage nodes so that each of the two or more groups of storage nodes stores all of the data chunks; and allocating the error-correcting code chunks between the two or more groups of storage nodes, where:

each group of storage nodes is allocated one or more unique error-correcting code chunks.

32. The system of claim 31, where:

each group of storage nodes is allocated a same number of error-correcting code chunks.

33. The system of claim 31, where:

generating the plurality of error-correcting code chunks comprises generating the plurality of code chunks so that the total number of error-correcting code chunks generated is based on the formula (R*c), where R is the total number of groups of storage nodes, and c is a variable parameter related to a level of redundancy; and each group of storage nodes is allocated c unique error-correcting code chunks.

* * * * *

UNITED STATES PATENT AND TRADEMARK OFFICE
CERTIFICATE OF CORRECTION

PATENT NO. : 8,484,536 B1  Page 1 of 1
APPLICATION NO. : 12/748066
DATED : July 9, 2013
INVENTOR(S) : Robert Cypher It is certified that error appears in the above-identified patent and that said Letters Patent is hereby corrected as shown below:

In the Claims:

Column 14, line 66, in Claim 12, after "storage" delete "medium".

Signed and Sealed this
Twenty-fourth Day of September, 2013

Teresa Stanek Rea
*Deputy Director of the United States Patent and Trademark Office*